US005594821A

United States Patent [19]

Cheng

[11] Patent Number: 5,594,821

[45] Date of Patent: Jan. 14, 1997

[54] INTEGRATED OPTICAL ISOLATOR

[75] Inventor: Yihao Cheng, Kanata, Canada

[73] Assignee: JDS Fitel Inc., Nepean, Canada

[21] Appl. No.: 442,361

[22] Filed: May 16, 1995

[30] Foreign Application Priority Data

Apr. 10, 1995 [CA] Canada .................................. 2146737

[51] Int. Cl.$^{6}$ ................................................ G02B 6/28

[52] U.S. Cl. ................................ 385/24; 385/27; 385/34; 385/14

[58] Field of Search ................................ 385/24, 27, 14, 385/34; 359/282; 372/703

[56] References Cited

U.S. PATENT DOCUMENTS 5,082,343 1/1992 Coult et al. ................................ 385/34
5,267,078 11/1993 Shiraishi et al. ........................ 359/282

FOREIGN PATENT DOCUMENTS 5-181035 7/1993 Japan ...................................... 385/24

*Primary Examiner*—Rodney B. Bovernick
*Assistant Examiner*—Yisuu Song
*Attorney, Agent, or Firm*—Neil Teitelbaum & Associates

[57] ABSTRACT

An integrated optical isolator arrangement is described that is capable of isolating an input optical signal and coupling a pump signal. The coupler includes a pair of lenses with an isolator disposed therebetween. The isolator is sandwiched between a splitter/filter and a wavelength selective device. An end face of each lens has an input and an output port for receiving and transmitting optical signals. The splitter/filter is selected to transmit some of the input signal on a first input port and to reflect the remaining untransmitted portion of the input optical signal to a first output port proximate to the first input port. The wavelength selective device allows the input signal from the first input port to pass through it to a second output port, and in addition, reflects a pump signal transmitted on the second input port to the second output port for combination with the input optical signal.

7 Claims, 3 Drawing Sheets

INTEGRATED OPTICAL ISOLATOR

FIELD OF THE INVENTION

This invention relates to an integrated optical isolator capable of providing a plurality of functions.

BACKGROUND OF THE INVENTION

Optical couplers, taps, and isolators are some of the most ubiquitous of all passive optical components found in most optical communication systems. One use of optical couplers is in the field of optical fiber amplifiers that require both a communication signal and a pump signal to be coupled into the amplifier. Optical taps are often used to remove a portion of a signal for monitoring or, more commonly to divert a portion a signal to different optical circuitry and components. Optical isolators are generally used to allow signals to propagate in a forward direction but not in a backward direction. These isolators are often used prevent unwanted back reflections from being transmitted back to a signal's source. Commercially available optical fiber amplifiers usually include a tap, an isolator and a wavelength division multiplexer at an input side of the amplifier; the output side of the amplifer usually includes two taps and an isolator. Most often, intermediate the input and output sides of the amplifier is a rare earth doped amplifying optical fiber. Unfortunately these components are provided as discrete components which are bulky and have an associated signal power loss. Therefore, there is a need to integrated these functions into a single device.

An isolated optical coupler is disclosed in U.S. Pat. No. 5,082,343 in the name of Coult et al. issued Jan. 21, 1992. The coupler described in the patent is comprised of a pair of lenses having a wavelength selective device and an isolator disposed therebetween. Although the device integrates two components required in an optical fiber amplifier and appears to perform its intended function of coupling a pump signal to an optical communication signal, there remains a need for a small, compact, integrated optical isolating device that can integrate all the required components in an optical fiber amplifier; that is, having a port for providing a pump signal and having an additional port for tapping some of the input optical signal and having different kinds of tapping functions on a plurality of output ports. For example, in many instances, where a pump signal is not required for amplification, there exists a need for an isolating device that will provide a port for tapping some of an input signal, and another port for monitoring unwanted back reflections. It is an object of this invention to provide such a device. This and other functionality can be provided by the invention described hereafter.

SUMMARY OF THE INVENTION

The need remaining in the prior art is addressed by the present invention which relates to an integrated multi-port optical isolating circuit, and more particularly an optical isolator arrangement suitable for coupling to at least four optical fibers.

In accordance with an aspect of the invention, a multi-port integrated optical isolating device is provided, that comprises: a first collimating lens including a first port and a second port disposed along a same endface thereof; a second collimating lens including a third port and a fourth port disposed along a same endface thereof, the second collimating lens disposed in a coaxial relationship with said first collimating lens or disposed for optical alignement with said first collimating lens; at least two optical means, each optical means being one of a wavelength selective means for transmitting predetermined wavelengths and reflecting others, and a beam splitter/filter means for allowing a portion of a beam to pass while reflecting a remaining portion, said at least two optical means being disposed between the first collimating lens and the second collimating lens; and, optical isolating means disposed between the at least two optical means for allowing an optical beam to pass in a first direction and for substantially preventing the optical beam from counter propagating in a reverse direction.

In accordance with an exemplary embodiment and particular aspect of the invention, a multi-port integrated optical isolating device for performing wavelength division multiplexing and isolating an optical signal, is provided comprising: a first collimating lens including a first port and a second port disposed along a same endface thereof; a second collimating lens including a third port and a fourth port disposed along a same endface thereof, the second collimating lens disposed in a coaxial relationship with said first collimating lens or disposed for optical allignment with the first collimating lens; at least two optical wavelength selective means each wavelength selective means for transmitting at least a first predetermined wavelength and for reflecting a second predetermined wavelengths, said at least two optical wavelength selective means being disposed between the first collimating lens and the second collimating lens; and, optical isolating means disposed between the at least two wavelength selective means for allowing an optical beam to pass in a first direction and for substantially preventing the optical beam from counter propagating in a reverse direction.

In accordance with an exemplary embodiment and another aspect of the invention, there is provided a multi-port integrated optical isolating splitter for performing a tapping an monitoring function and isolation of an optical signal. The integrated device comprises: a first collimating lens including a first port and a second port disposed along a same endface thereof; a second collimating lens including a third port and a fourth port disposed along a same endface thereof, the second collimating lens disposed in a coaxial relationship with said first collimating lens; a first optical splitter/filter for transmitting at least a portion of a signal and for reflecting a remaining portion to a different port, said first splitter filter being disposed between the first collimating lens and the second collimating lens; a second optical splitter/filter for transmitting at least a portion of a signal from an input port to an output port and for reflecting a remaining portion to a different port, said second splitter filter being disposed between the first collimating lens and the second collimating lens; and, optical isolating means disposed between the first and second optical splitter/filter for allowing an optical beam to pass in a first direction and for substantially preventing the optical beam from counter propagating in a reverse direction.

BRIEF DESCRIPTION OF THE DRAWINGS

Exemplary embodiments of the invention will be described in conjunction with the drawings, in which.

DETAILED DESCRIPTION

Figure 1:
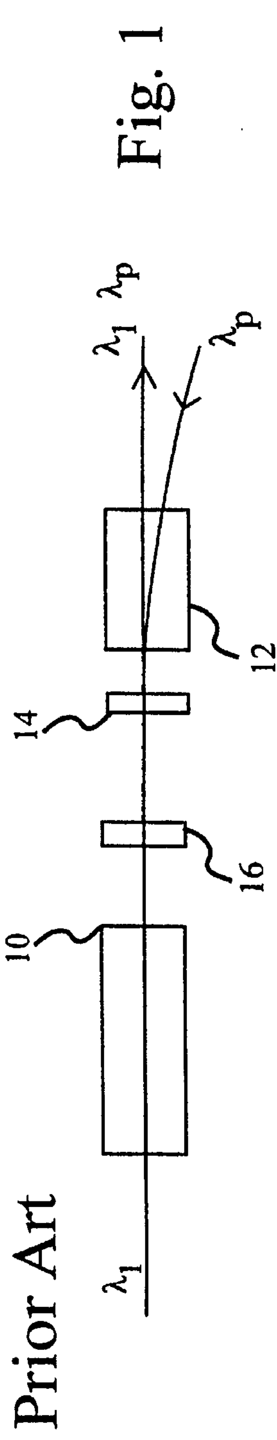
FIG. 1 is a schematic block diagram of a prior art isolated optical coupler illustrative of the function of the device.

Like elements in all of the figures have been assigned like reference numerals. Referring now to FIG. 1, a prior art device described in U.S. Pat. No. 5,082, 343 is shown. The device includes a first single port lens 10 and a second dual port lens 12 that are disposed along a common optical axis. A wavelength division multiplexer (WDM) filter 14 and an optical isolator 16 are disposed between the two lenses 10 and 12 along the common optical axis. Thus the components 10, 12, 14, and 16 are all optically aligned. In operation, an input signal of wavelength $\lambda_1$ enters the single port lens 10, passes through the isolator 16, the WDM filter 14 and exits an output port at the second lens 12. A amplifying pump signal $\lambda_p$ coupled to an input port of the second lens 12 is reflected by the WDM filter 12 to the output port on the second lens 12 with the input signal of wavelength $\lambda_1$.

Figure 2:
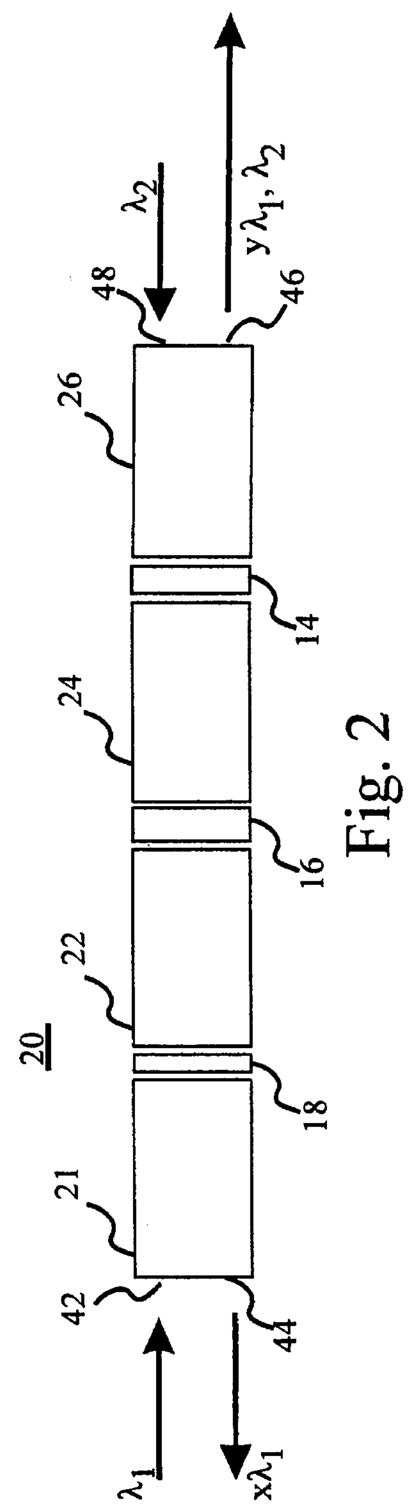
FIG. 2 is a schematic block diagram of an exemplary multi-port integrated optical isolator tap-coupler having an output tapping port and an input port for coupling a pump signal to an input signal.
Figure 3:
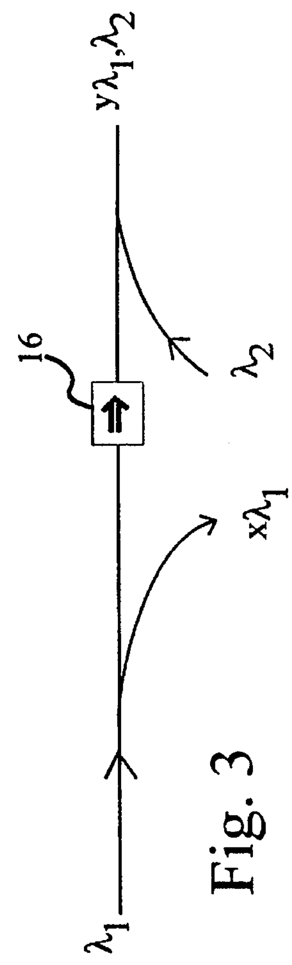
FIG. 3 is a functional schematic diagram depicting the function of the optical isolator shown in FIG. 2.

Referring now to FIGS. 2 and 3, a preferred embodiment of the invention is shown. FIG. 2 illustrates an exemplary isolated optical tap and WDM coupler 20.

In accordance with the teachings of the present invention, isolated tap-coupler 20 comprises a first input port 42, a first output port 44, second input and output ports 48 and 46 respectivley, a first collimating lens 21 and a second collimating lens 26. Preferably, the first and second lenses 21 and 26 are disposed in a coaxial relationship as shown in FIG. 2, however this is not essential as long as they are optically aligned in some manner. A splitter filter 18 and a wavelength selective means in the form of a WDM filter 14 are disposed between the first and second lenses 21 and 26. Device 18 is selected so as to reflect a predetermined portion of the optical signal propagating towards it, and to transmit the remaining portion of the unreflected signal. The WDM filter 14 is selected to reflect a first predetermined wavelength $\lambda_2$ (i.e. the pump wavelength) and to transmit a second predetermined wavelength $\lambda_1$ (i.e. a message signal wavelength). In order to overcome signal degradation partly due to unwanted reflections, an isolator is utilized. In the embodiment of FIG. 2 an isolator 16 is disposed between the splitter/filter 18 and the WDM filter 14. In addition, lenses 22 and 24 are provided to focus the beam so that a thin isolator element 16 may be used. Optionally in an alternative embodiment, the lenses 22 and 24 are absent and a suitably, thicker, isolator 16 not requiring a focused beam is used. With reference to FIG. 3, the function of the device 20 is clearly illustrated. An input and output port are provided on either side of the isolator 16. Upstream of the isolator the signal of wavelength $\lambda_1$ is launched into the first input port 42 of the device and the first output port 44 provides for tapping some of the signal of wavelength $\lambda_1$. Downstream of the isolator, a pump signal having a wavelength $\lambda_2$ is launched into the second input port 48 and is combined with the untapped signal of wavelength $\lambda_1$ into the second output port 46.

In the embodiment described heretofore, and the embodiments described hereafter, and in accordance with the invention, the splitter/filter 18 and WDM filter 14, shown as discrete components and described as disposed between other elements, may be conveniently be replaced by same functioning means in the form of coatings applied to end faces of the isolator 16, or the lenses 21, 22, 23, or 24. Of course by coating lenses or the isolator 16 in this manner, the device 20 can be miniaturized.

Figure 4:
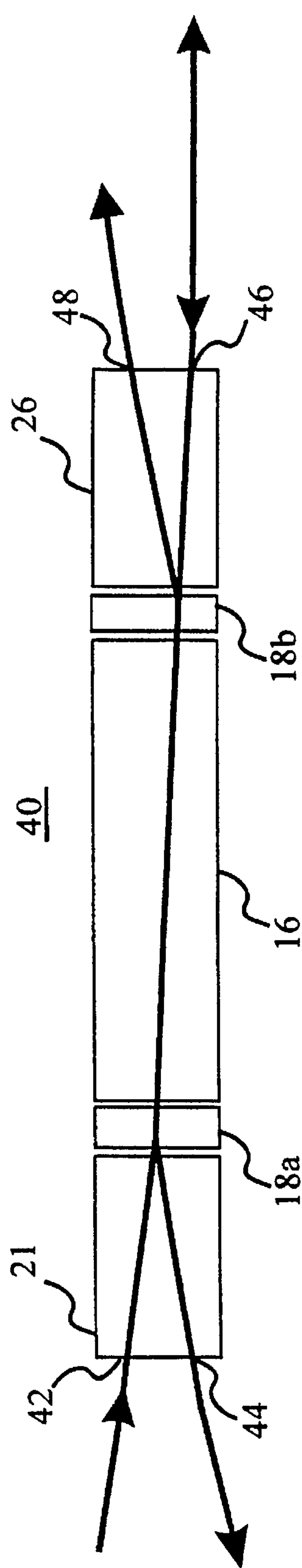
FIG. 4 is a schematic block diagram of an alternative multi-port integrated optical isolator having a monitoring port for monitoring reflections.

Referring now to FIG. 4 an alternative embodiment of the isolated tap coupler is described. In the arrangement of FIG. 4, an isolated tap 40 provides a plurality of tapping functions. In common with the device shown in the previous embodiment, the isolated tap coupler 40 comprises a first and second lens 21 and 26 having an isolator 16 disposed therebetween. In common with the previous embodiment two passive optical elements are disposed between ends of the isolator 16 and the first and second lenses 21 and 26. However, in this embodiment both of the optical elements are splitter/filters **18*a* and 18*b*. An input and an output port 42 and 44 respectively, are disposed at an end face of the upstream lens 21 for launching and receiving signals. The output port 44 functions as a tap to remove a portion of the signal propagating into the device 40 through the input port 42. The splitter/filter 18*a* adjacent to the lens 21 allows some of the launched signal from the input port 42 to pass through it, reflecting the remaining portion of the signal back to the output port 44. The isolator 16 allows the signal that passed through the splitter filter 18*a* to propagate toward the an input/output port 46 at an end face of the lens 26. Another output port 48 proximate to the input/output port 46 provides a tapping location for monitoring any back reflections that may be present returning upstream through the input/output port 46. The splitter filter 18*b* functions in the same manner as the splitter/filter 18*a*. Splitter filter 18*b* allows the upstream signal entering the device 40 to pass through it; furthermore, the filter I reflects a small portion of any back reflections to the monitoring port 48. The isolator 16 ensures that any back reflections will not propagate to the input port 42 or the output port 44. Therefore, in the present embodiment, the device 40 provides a means launching an input signal to an output end, tapping some of the input signal light not destined for the output end, and provides a means for monitoring unwanted back reflections. As was described heretofore, the splitter filters may be in the form of a coating deposited on end faces of the lenses adjacent the isolator or on end faces of the isolator 16**.

Figure 5:
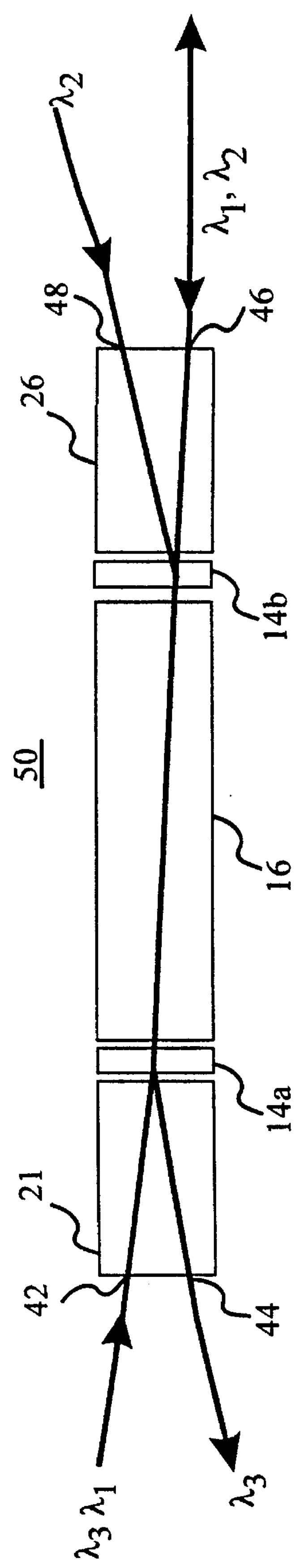
FIG. 5 is a schematic block diagram of an alternative multi-port integrated optical isolator having demultiplexing means for demultiplexing two input signals and having a port for pumping an amplifying signal.

Turning now to FIG. 5, another embodiment of the device is shown wherein the splitter filters of the previous embodiment are replaced with WDM filters **14*a* and 14*b*. The device 50 provides a means for launching two signals of two different predetermined wavelengths into an input port 42 at an upstream end of device 50. The two wavelengths are demultiplexed (separated according to their wavelength) into two separate output ports 44 and 46. Conveniently, an input port 48 at a downstream end of the device 50** provides a location to launch a signal having a third and different wavelength (pump signal) so that it may be combined with one of the two signals that has been wavelength demultiplexed.

Figure 6:
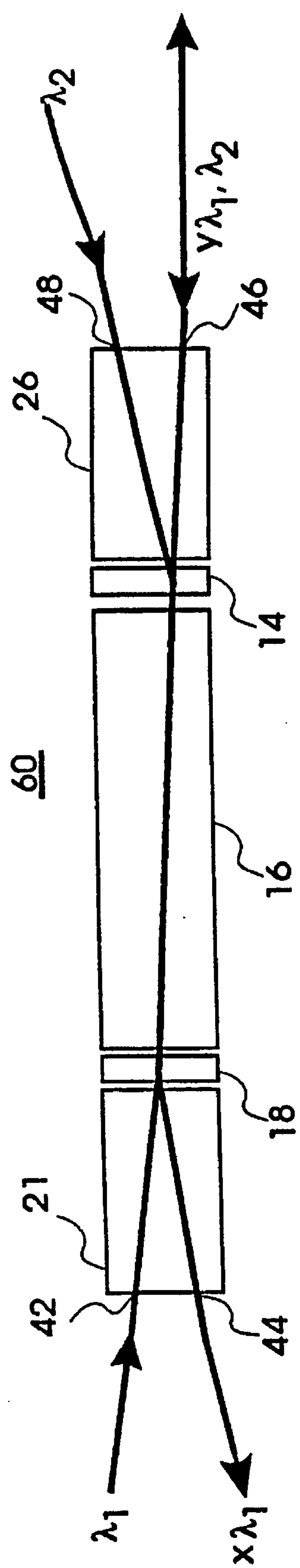
FIG. 6 is a schematic block diagram of an multi-port integrated optical isolated tap-coupler having an output tapping port and an input port for coupling a pump signal to an input signal having the same functionality as the multi-port device of FIG. 2; and, FIG. 7 is block diagram of an optical amplifer incorporating the integrated optical isolator of this invention.
Figure 7:
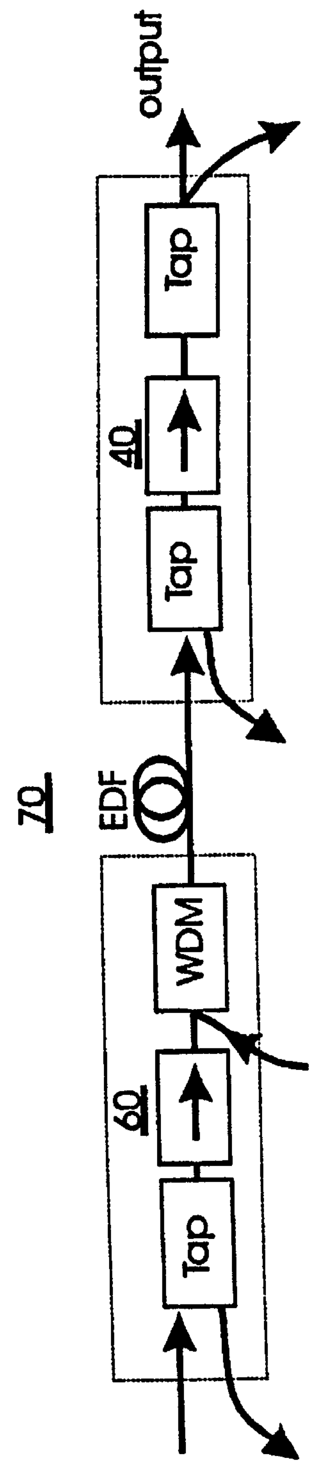

Turning now, to FIGS. 6 and 7, a device 60 is shown having fewer elements, but the same functionality as device 20 of FIG. 2. In FIG. 7 an erbium doped fiber amplifier 70 comprises an integrated device 60 coupled to an erbium doped optical fiber which is coupled to the integrated device 40 in accordance with this invention.

The optical elements described in this invention may be having their end faces glued to adjacent end faces of optical elements, or, alternatively may be epoxied or affixed to a housing so that the elements are not physically interconnected. Alternatively, the optical elements may be held adjacent one another by an optical gel placed between end faces of the elements.

Of course, numerous other embodiments may be envisaged without departing from the spirit and scope of the invention.

What I claim is:

1. A multi-port integrated optical isolating device comprising:

a first collimating lens including a first port and a second port disposed along a same endface thereof;

a second collimating lens including a third port and a fourth port disposed along a same endface thereof, the second collimating lens being optically aligned with said first collimating lens;

at least two optical means comprising a beam splitter/filter and a wavelength selective means for reflecting predetermined wavelengths and transmitting others, and means for allowing a portion of a beam to pass while reflecting a remaining portion, said at least two optical means being disposed between the first collimating lens and the second collimating lens;

optical isolating means disposed between the at least two optical means for allowing an optical beam to pass in a first direction and for substantially preventing the optical beam from counter propagating in a reverse direction.

2. A multi-port integrated optical isolating device comprising:

a first collimating lens including a first port and a second port disposed along a same endface thereof;

a second collimating lens including a third port and a fourth port disposed along a same endface thereof, the second collimating lens being optically aligned with said first collimating lens; at least two optical means including two wavelength selective means for transmitting predetermined wavelengths and reflecting others, said at least two optical means being disposed between the first collimating lens and the second collimating lens; and, optical isolating means disposed between the at least two optical means for allowing an optical beam to pass in a first direction and for substantially preventing the optical beam from counter propagating in a reverse direction.

3. A multi-port integrated optical isolating device comprising:

a first collimating lens including a first port and a second port disposed along a same endface thereof, wherein the first and second ports are at least input and output ports respectively;

a second collimating lens including a third port and a fourth port disposed along a same endface thereof, the second collimating lens being optically aligned with said first collimating lens;

at least two optical means, each optical means being one of a wavelength selective means for transmitting predetermined wavelengths and reflecting others, and a beam splitter/filter means for allowing a portion of a beam to pass while reflecting a remaining portion, said at least two optical means being disposed between the first collimating lens and the second collimating lens; and, optical isolating means disposed between the at least two optical means for allowing an optical beam to pass in a first direction and for substantially preventing the optical beam from counter propagating in a reverse direction.

4. A multi-port integrated optical isolating device as defined in claim 3, wherein at least one of said two optical means are in the form of coating applied to one of an end face of the optical isolating means, and an end face of at least one of the lenses.

5. A multi-port integrated optical isolating device as defined in claim 3, wherein at least one of the two optical means are in the form of discrete optical components.

6. A multi-port integrated optical isolating device as defined in claim 3, further comprising two focusing lenses disposed between the two optical means and the optical isolating device for focusing at end faces of the optical isolating means.

7. A multi-port integrated optical isolating device for performing wavelength division multiplexing and isolating an optical signal, comprising;

a first collimating lens including a first port and a second port disposed along a same endface thereof; p1 a second collimating lens including a third port and a fourth disposed along a same endface thereof, the second collimating lens being optically aligned with said first collimating lens;

at least two optical wavelength selective means each wavelength selective means for transmitting at least a first predetermined wavelength and for reflecting a second predetermined wavelengths, said at least two optical wavelength selective means being disposed between the first collimating lens and the second collimating lens; and, optical isolating means disposed between the at least two wavelength selective means for allowing an optical beam to pass in a first direction and for substantially preventing the optical beam from counter propagating in a reverse direction.

* * * * *